United States Patent [19]

Mutziger

[11] 3,968,697
[45] July 13, 1976

[54] SOUND LEVEL METER
[75] Inventor: John Stefan Mutziger, East Moline, Ill.
[73] Assignee: Deere & Company, Moline, Ill.
[22] Filed: May 30, 1975
[21] Appl. No.: 582,508

[52] U.S. Cl. .................................................. 73/557
[51] Int. Cl.² ......................................... G01H 3/14
[58] Field of Search ...................... 73/556, 557, 558

[56] References Cited
UNITED STATES PATENTS

| | | | |
|---|---|---|---|
| 2,671,134 | 3/1954 | Chrystie | 73/557 |
| 3,747,703 | 7/1973 | Knowd et al. | 73/558 |
| 3,848,471 | 11/1974 | Hamburg et al. | 73/557 |
| 3,868,857 | 3/1975 | Maddox et al. | 73/558 |

OTHER PUBLICATIONS
Weinberger, A., Portable Impulse Sound–Level Meter EGT. in News from Rohde & Schwarz 47, vol. 11 (1971), pp. 5–9.

Primary Examiner—Herbert Goldstein
Assistant Examiner—Frederick Shoon

[57] ABSTRACT

Apparatus for processing a sound transducer output by RMS and log converters over a wide dynamic range through automatic ranging circuitry sensing of log converter output to initiate range changes and fast averaging cicuitry responsive to range changes to implement the minimum RMS averaging time and to reset hold circuitry.

10 Claims, 1 Drawing Figure

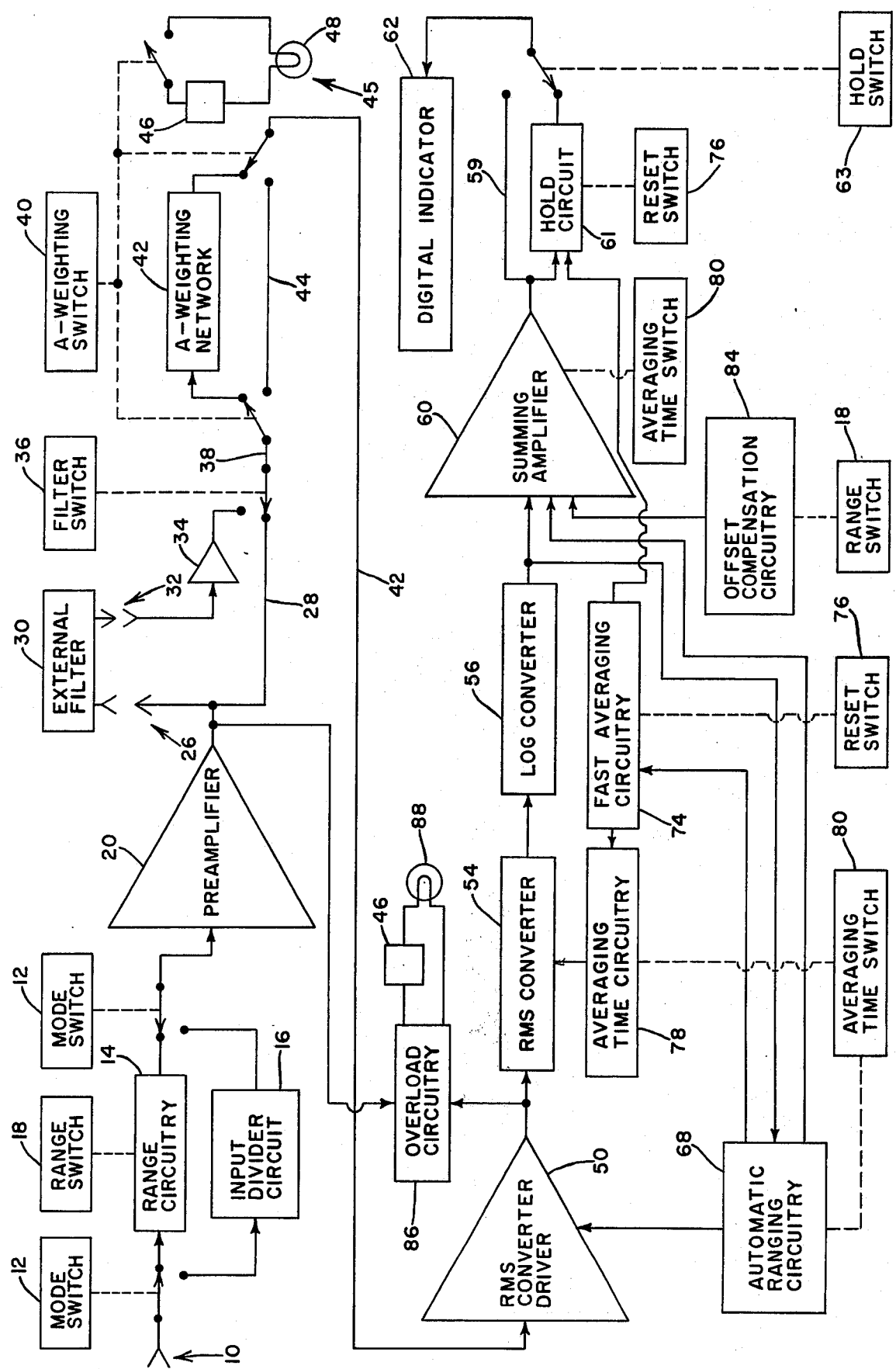

3,968,697

SOUND LEVEL METER

BACKGROUND OF THE INVENTION

The present invention relates generally to sound level meters and more particularly to wide dynamic range sound level meters.

Conventional sound level meters with an automatic ranging feature sense RMS converter output to initiate range changes and at low RMS converter outputs substantial variations in the range switch point are possible making a portion of the dynamic range unusable in order to compensate for these variations.

In addition, when the RMS is being averaged over a long time interval, a signal change will cause a substantial settling time before a valid new RMS value can be obtained.

Further, in the past when it was desirable to know the peak sound levels during a series of tests, there was no automatic way of sequentially obtaining the peak readings on the indicator.

SUMMARY OF THE INVENTION

It is a general object of the present invention to provide a convenient, wide dynamic range sound level meter.

The sound level meter provides for accurate initiation of range changes by automatic ranging circuitry sensing of the log converter output which is less subject to inherent signal errors at low sound levels. The meter also provides automatic ranging circuitry control of automatic RMS quick averaging and hold circuitry resetting.

The above and additional advantages and objects of the present invention will become apparent to those skilled in the art from a consideration of the following detailed description of the preferred embodiment when taken in conjunction with the accompanying drawing.

BRIEF DESCRIPTION OF THE DRAWING

The drawing is a block diagram of the internal circuitry of the sound level meter of the present invention.

DESCRIPTION OF THE PREFERRED EMBODIMENT

Referring to the drawing, there is shown a block diagram of the sound level meter including an input connecter 10 selectively connected by a mode switch 12 to range circuitry 14 or input divider circuit 16. The range circuitry 14 is incrementally and selectively operated by a manually operable range switch 18. The mode switch 12 also selectively connects the range circuitry 14 or the input divider circuit 16 to the input of a preamplifier 20.

The output of the preamplifier 20 is connected to an external filter input connecter 26 and a first linear lead 28. An external filter 30, such as an octave filter, may be connected to the input connecter 26. The filter 30 output is connected to an output connector 32 which is buffered by a transistor emitter follower 34. A lead 38 is selectively connectible by a manually operable filter switch 36 to the follower 34 and the first linear lead 28.

The lead 38 is further selectively connectible by a manually operable A-weighting switch 40 to an A-weighting network 42 or a second linear lead 44. The A-weighting switch 40 also selectively connects the output of the A-weighting network 42 or the second linear lead 44 to a main signal lead 42. When the A-weighting network 42 is selected, the A-weighting switch 40 closes the A-weighting indicator circuit 45 which includes a power source 46 and an indicator light 48.

The main signal lead 42 is connected to a Root Mean Square (hereinafter referred to as RMS) converter driver 50. The output of the RMS converter driver 50 is connected to the input of a RMS converter 54 whose output is connected to the input of a log converter 56. The output of the log converter 56 is connected to the input of a summing amplifier 60. The output of summing amplifier 60 is connected to an output lead 59 and a hold circuit 61 either of which may be selectively connected by a manually operable hold switch 63 to a conventional numerical digital voltage indicator device 62. The hold circuit 61 is resettable by means of a manually operable reset switch 76 or a fast averaging circuitry 74, and is designed to maintain the highest signal received from the summing amplifier 60 until reset.

Automatic ranging circuitry 68 is connected to sense the output of the log converter 56 and is connected to the averaging time switch 80. Further, the automatic ranging circuitry 68 is connected to the RMS converter driver 50 and to the input of the summing amplifier 60.

The fast averaging circuitry 74, controllable by the reset switch 76, and the automatic ranging circuitry 68, is also connected to the hold circuit 61 and to averaging time circuitry 78. The averaging time circuitry 78 which is controllable by a manually operable averaging time switch 80 is connected to the RMS converter 54.

Offset compensation circuitry 84, controlled by the range switch 18, is connected to the input of the summing amplifier 60.

Overload circuitry 86, including an indicator light 88 and the source 46, is connected at selected points in the sound level meter as at the output of the preamplifier 20 and the output of the RMS converter driver 50 to detect overloads.

The sound level meter of the present invention is designed to process the sound level proportional electrical output of a sound transducer such as a microphone or a dial-type analogue sound level meter for digital display of the resulting sound level in decibels. When a microphone is connected to the input connecter 10, the mode switch 12 is switched to connect the input connecter 10 with the range circuitry 14 which consists of a conventional 10 dB stepped attenuator controlled by the range switch 18. The mode switch 12 further selectively connects the range circuitry to the preamplifier 20 so as to provide a properly attenuated microphone signal to the preamplifier 20. When the AC output of the dial-type analogue sound level meter is connected to the input connecter 10, the mode switch 12 is switched to connect the input connecter 10 with the input divider circuit 16 for attenuating the AC output. The mode switch 12 also selectively connects the input divider circuit 16 with the preamplifier 20.

The preamplifier 20 includes a conventional internal scaling adjustment control to produce the proper sound level indication when an acoustic calibrator is placed over the microphone or to produce the same reading as the dial-type analogue sound level meter to which the sound level meter is attached. The amplified signal from the preamplifier 20 is then sent through the external filter 30 or the lead 28 by switching of the filter switch 36.

When the external filter 30 is selected, the external filter 30 is driven by the low output impedance signal of the preamplifier 20. The transistor emitter follower 34 provides a high input impedance for the external filter. Many external filters 30 have unity gain through the pass band of interest and, therefore, will not change the internal scaling previously adjusted in the preamplifier 20 and such filters can be introduced with no error in the sound level read-out. However, if the external filter 30 has a gain of other than unity, scaling adjustments are made in the preamplifier 20 to provide direct sound level read-out.

By switching the A-weighting switch 40, the amplified signal from the preamplifier 20 can be A-weighted. Since this can be accomplished while the filter switch 36 is in either position, series connection of the external filter 30 along with the A-weighting network 42 is possible to permit A-weighted external filter readings to be made. For example, A-weighted one-third octave readings would be obtainable for noise analysis.

The amplified signal which may have been filtered is processed by the RMS converter driver 50 as will later be described. The signal from the RMS converter driver 50 is introduced to the RMS converter 54 where the RMS of the signal is determined and then averaged over a selectively variable time by the averaging time circuitry 78. The averaging times provided herein range from 0.035 second for measurements of impulsive sound up to ten seconds for measurements of continuous sound. The averaged RMS value signal is sent to the log converter 56 and then sent to the summing amplifier 60.

The summing amplifier 60 has several functions. One function is to keep the overall instrument scaling consistent when the preamplifier gain is changed by the range switch 18. An offset is added to the log converter output in the summing amplifier 60 with the weight of the offset being increased 10 dB for each range selected above the lowest range by the range switch 18. A second function of the summing amplifier 60 is to scale the output of the log converter 56 to allow direct reading in decibels of the sound level being measured. In this way in the preferred embodiment, the digital indicator 62 displays a voltage equal to the sound level with a scale factor of one-tenth volt per 10 dB sound level.

The summing amplifier 60 also has a three second decay time circuit included which is activated by the averaging time switch 80 being set for .035 second. This conforms to some of the proposed international standards for impulse sound level meters.

In taking noise measurements, it is often desirable to know the peak noise level encountered during a test. The hold circuit 61 provides the capability of maintaining the highest summing amplifier output to the digital indicator 62 until reset by switching the reset switch 63. For a series of repetitive noise measurements, it is often desirable to know only the peak noise level for each test and to have an automatic reset when the noise level decreases between the tests. The fast averaging circuitry 74 provides this automatic reset by resetting the hold circuit 61 whenever a range change occurs.

The automatic ranging circuitry 68 is provided as a means for range extension. The dynamic range of the circuitry preceeding the RMS converter 54 is much greater than the 60 dB voltage range of the RMS converter 54. In order to capitalize on the wide dynamic range of these circuits, the RMS converter input signal level is automatically increased by 30 dB when the signal level reaches a certain low value. This feature allows signals over a 90 dB range to be measured without manually changing a range selector.

The automatic ranging function operates when the RMS converter input signal drops below a minimum desired level except in impulse mode. The minimum value is detected at the output of the log converter 56 and a 30 dB gain is introduced in order to obtain a wide 90 dB dynamic range by switching the gain of the previously mentioned RMS converter driver 50. The signal gain increase is then normalized by a minus 30 dB input to the summing amplifier 60 to provide the proper overall reading. When signals increase from a lower to a higher level, this causes the RMS converter 54 input to exceed a maximum desired value and the 30 dB gain is removed from the RMS converter driver 50 and the minus 30 dB input is removed from the summing amplifier 60.

By sensing the output of the log converter 56, a more accurate switch point at low signal levels can be obtained than if the RMS converter 54 output was sensed directly. In the preferred embodiment, the RMS converter output voltage at the low level switch point is 0.0316 volt and a one decibel variation at this voltage is +0.004 volts while the log converter output voltage change for one decibel is +0.050 volt. Thus, the automatic ranging circuitry 68 can more accurately sense by a factor of greater than 10 the lower level switch point by sensing log converter output than by sensing RMS converter output, and hands-off operation without running out of range is possible with full utilization of the entire operating range. This feature is especially important for octave or third octave measurements.

The high level switch point is selected to maintain a sufficient peak-to-RMS crest factor to prevent RMS converter overloads when high peak signals are encountered prior to changing the gain and a 10 db hysteresis is incorporated in the automatic ranging circuitry 68 to prevent hunting around the switch point.

The automatic ranging circuitry 68 is locked in the high range when the 0.035 second mode is selected since the automatic ranging takes too long to get accurate values in this mode.

The offset compensation circuitry 84 operates with the range switch 18 to increase the weight of the offset in the summing amplifier 10 dB for each 10 dB range selected above the lowest range.

The fast averaging circuitry 74 is provided to allow selection of the .035 second averaging time without changing the averaging time switch 80. When a long averaging time has been selected and a change in the level being measured occurs, considerable time will normally be required for the averaging time circuitry to change to the new average value. This time will be greatly reduced by operating the reset switch 76 which causes the RMS converter 54 to average momentarily at the .035 second averaging time and then resume the preselected long averaging time. When the long averaging time is resumed, the long averaging time components in the averaging time circuitry 78 are conditioned to the value obtained when the reset switch 76 is operated. The fast averaging circuitry 74 is further responsive to the automatic ranging circuitry 68 to automatically initiate the .035 second averaging time each time an automatic range change occurs. This feature prevents excessive settling time for the changed range when using a long averaging time as previously detailed. The fast averaging circuitry 74 is further connected to the hold circuit 61 to reset the hold circuit to prevent the holding of an erroneously high or low signal when the automatic range change occurs.

The overload circuitry 86 is included to monitor the signal level at strategic locations in the sound level meter. If excessive levels occur which cause errors in the reading, the overload indicator light 88 will light. The circuitry is sensitive to very short duration overloads and for such short term overloads, the light is held on by an integral conventional holding circuit in the overload circuitry 86 for sufficient time to be noticed.

The signals from the summing amplifier are processed and produced by the numerical digital voltage indicator 62 for display for the operator.

Having thus described the construction and operation of the preferred embodiment of this invention, various modifications within the spirit and scope of the invention will become apparent to those skilled in the art and can be made without departing from the underlying principles of the invention as defined in the claims.

I claim:

1. A sound level meter comprising: preamplifier means responsive to the output of a sound transducer to provide an amplified signal proportional to the input to the sound transducer; RMS converter driver means for receiving and processing the amplified signal and switchable between a lower or higher level to produce a plurality of selectable output signals; RMS converter means connected to the RMS converter driver means for receiving and processing the driver means output signals to produce RMS value signals; log converter means for receiving and processing the RMS value signals to produce logarithmic value signals; automatic ranging circuitry means connected between the log converter means and the RMS converter driver means for receiving and processing the logarithmic value signals above or below a predetermined value to switch the RMS converter driver means respectively between the lower or higher level; said automatic ranging circuitry means including means for producing a first and second signals indicative of the switch of the RMS converter driver means; averaging time circuitry means connected to the RMS converter means for introducing a plurality of times over which the driver means output signals can be averaged in the RMS converter and means to produce the RMS value signals; fast averaging circuitry means connected to the automatic ranging circuitry means and to the averaging time circuitry means responsive to the first signal to cause the averaging time circuitry means to introduce a minimum averaging time to the RMS converter means; summing amplifier means responsive to the logarithmic value signals and to the second signal to provide scaled output signals for a digital indicator; and hold circuit means selectively connectible between the log converter means and the digital indicator for maintaining the highest value signal of the scaled output signals.

2. The sound level meter as claimed in claim 1 wherein the hold circuit means includes reset means connected to the fast averaging time circuitry means responsive to the inrtroduction of the minimum averaging time to release the highest value signal and maintain a subsequent highest value signal of the scaled output signals.

3. The sound level meter as claimed in claim 1 including overload circuitry means for sensing the amplified and driver means output signals above a predetermined overload value and providing an overload indication thereof; said overload circuitry means including means for maintaining overload indication resulting from short duration overloads.

4. A sound level meter comprising: preamplifier means responsive to the output of a sound transducer to provide an amplified signal proportional to the input to the sound transducer; RMS converter driver means for receiving and processing the amplified signal and switchable between a lower or higher level to produce a plurality of selectable output signals; RMS converter means connected to the RMS converter driver means for receiving and processing the driver means output signals to produce RMS value signals; log converter means for receiving and processing the RMS value signals to produce logarithmic value signals; automatic ranging circuitry means connected between the log converter means and the RMS converter driver means for receiving and processing the logarithmic value signals above or below a predetermined value to switch the RMS converter driver means respectively between the lower or higher level; said automatic ranging circuitry means including means for producing first and second signals indicative of the switch of the RMS converter driver means; averaging time circuitry means connected to the RMS converter means for introducing a plurality of times over which the driver means output signals can be averaged in the RMS converter means to produce the RMS value signals; fast averaging circuitry means connected to the automatic ranging circuitry means and to the averaging time circuitry means responsive to the first signal to cause the averaging time circuitry means to introduce a minimum averaging time to the RMS converter means; and summing amplifier means responsive to the log converted signal and to the second signal to provide scaled output signals for a digital indicator.

5. The sound level meter as claimed in claim 4 including overload circuitry means for sensing the amplified and driver means output signals above a predetermined overload value and providing an overload indication thereof; said overload circuitry means including means for maintaining overload indication resulting from short duration overloads.

6. A sound level meter comprising: preamplifier means responsive to the output of a sound transducer to provide an amplified signal proportional to the input to the sound transducer; RMS converter driver means for receiving and processing the amplified signal and switchable between a higher or lower level; to produce a plurality of selectable output signals; RMS converter means connected to the RMS converter driver means for receiving and processing the driver means output signal to produce RMS value signals; log converter means for receiving and processing the RMS value signals to produce logarithmic value signals; automatic ranging circuitry means connected to the log converter means and the RMS converter driver means for receiving and processing the logarithmic value signals above or below a predetermined value to switch the RMS converter driver means respectively between the lower or higher level; said automatic ranging circuitry means including means for producing an indicia signal indicative of the switching of the RMS converter driver means; and summing amplifier means responsive to the logarithmic value signals and to the indicia signal to provide scaled output signals for a digital indicator.

7. The sound level meter as claimed in claim 6 including overload circuitry means for sensing the amplified and driver means output signals above a predetermined overload value and providing an overload indication thereof; said overload circuitry means including means for maintaining overload indication resulting from short duration overloads.

8. A sound level meter comprising: preamplifier means responsive to the output of a sound transducer to provide an amplified signal proportional to the input to the sound transducer; RMS converter driver means for receiving and processing the amplified signal to produce a driver means output signal; RMS converter means connected to the RMS converter driver means for receiving and processing the driver means output signal to produce RMS value signals; log converter means for receiving and processing the RMS value signals to produce logarithmic value signals; amplifier means responsive to the logarithmic value signals to provide scaled output signals for a digital indicator; averaging time circuitry means connected to the RMS converter means for introducing a plurality of different time intervals over which the driver means output signals can be averaged in the RMS converter means to produce the RMS value signals; fast averaging circuitry means connected to the averaging time circuitry means for introducing a minimum averaging time thereto; and hold circuit means selectively connectible between the log converter means and the digital indicator for maintaining the highest value signal of the scaled output signals responsive to the introduction of the minimum averaging time to release the highest value signal and maintain a subsequent highest value signal.

9. A sound level meter comprising: preamplifier means responsive to the outputs of a sound transducer to provide amplified signals proportional to the input to the sound transducer; RMS converter driver means for receiving and processing the amplified signals to produce a driver means output signal; RMS converter means connected to the RMS converter driver means for receiving and processing the driver means output signal to produce RMS value signals; log converter means for receiving and processing the RMS value signals to produce logarithmic value signals; automatic ranging circuitry means connected to the log converter means and the RMS converter driver means for receiving and processing the logarithmic value signals above or below a predetermined value to switch the RMS converter driver means respectively between the lower or higher level; said automatic ranging circuitry means including means for producing an indicia signal indicative of the switching of the RMS converter driver means; summing amplifier means responsive to the logarithmic value signals and to the indicia signals to provide scaled output signals for a digital indicator, and hold circuit means selectively connectible between the log converter means and the digital indicator means for maintaining the highest value signal of the scaled output signals responsive to the indicia signal to release the highest value signal and maintain a subsequent highest value signal.

10. A sound level meter as claimed in claim 9 including overload circuitry means for sensing the amplified and driver means output signals above a predetermined overload value and providing an overload indication thereof; said overload circuitry means including means for maintaining overload indication resulting from predetermined short duration overloads.

* * * * *